Dec. 1, 1959        M. H. HALL        2,914,865
ARITHMETIC TEACHING AID TO DEMONSTRATE FRACTIONS
Filed Sept. 26, 1958        3 Sheets-Sheet 1
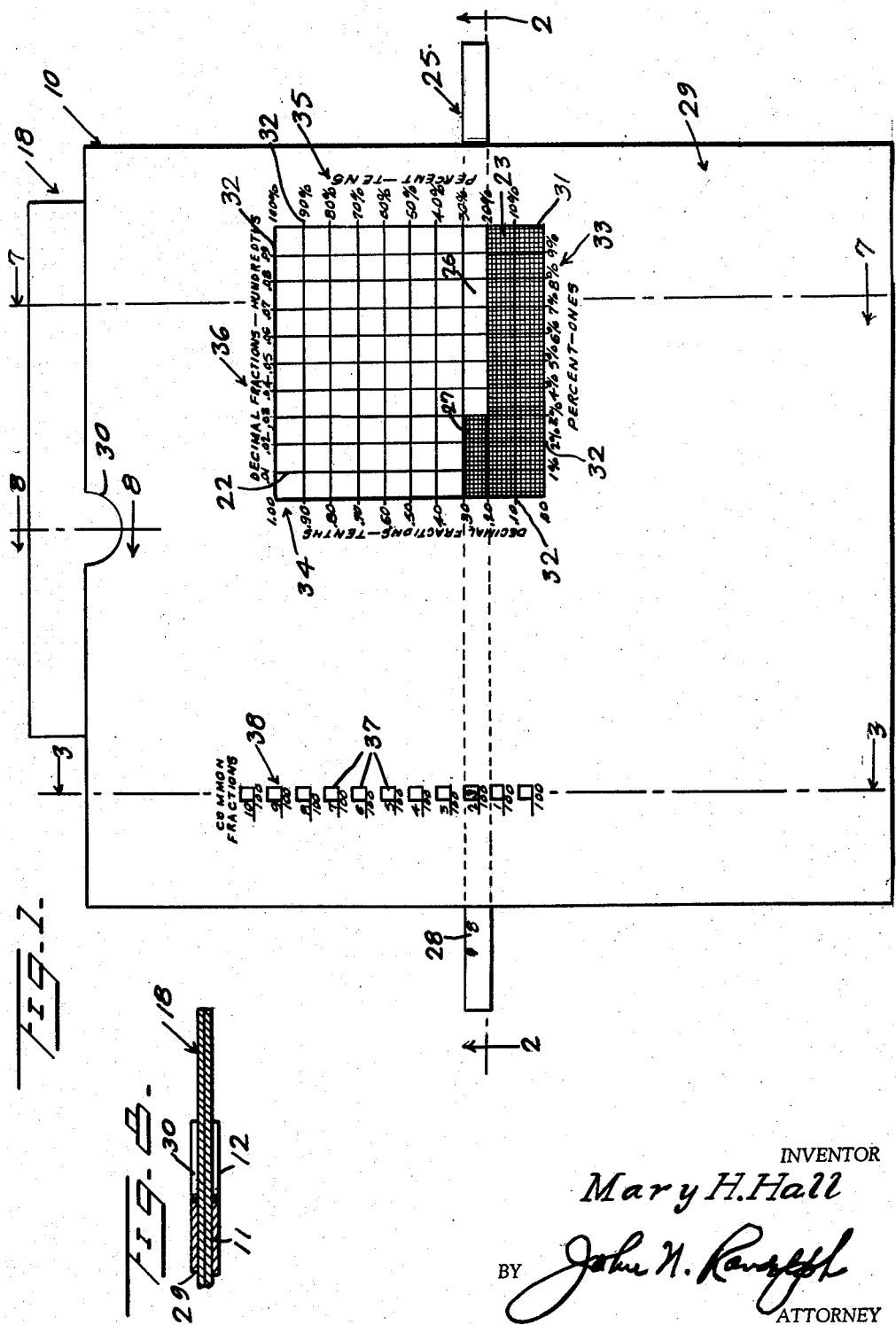
INVENTOR
Mary H. Hall
BY John N. Randolph
ATTORNEY

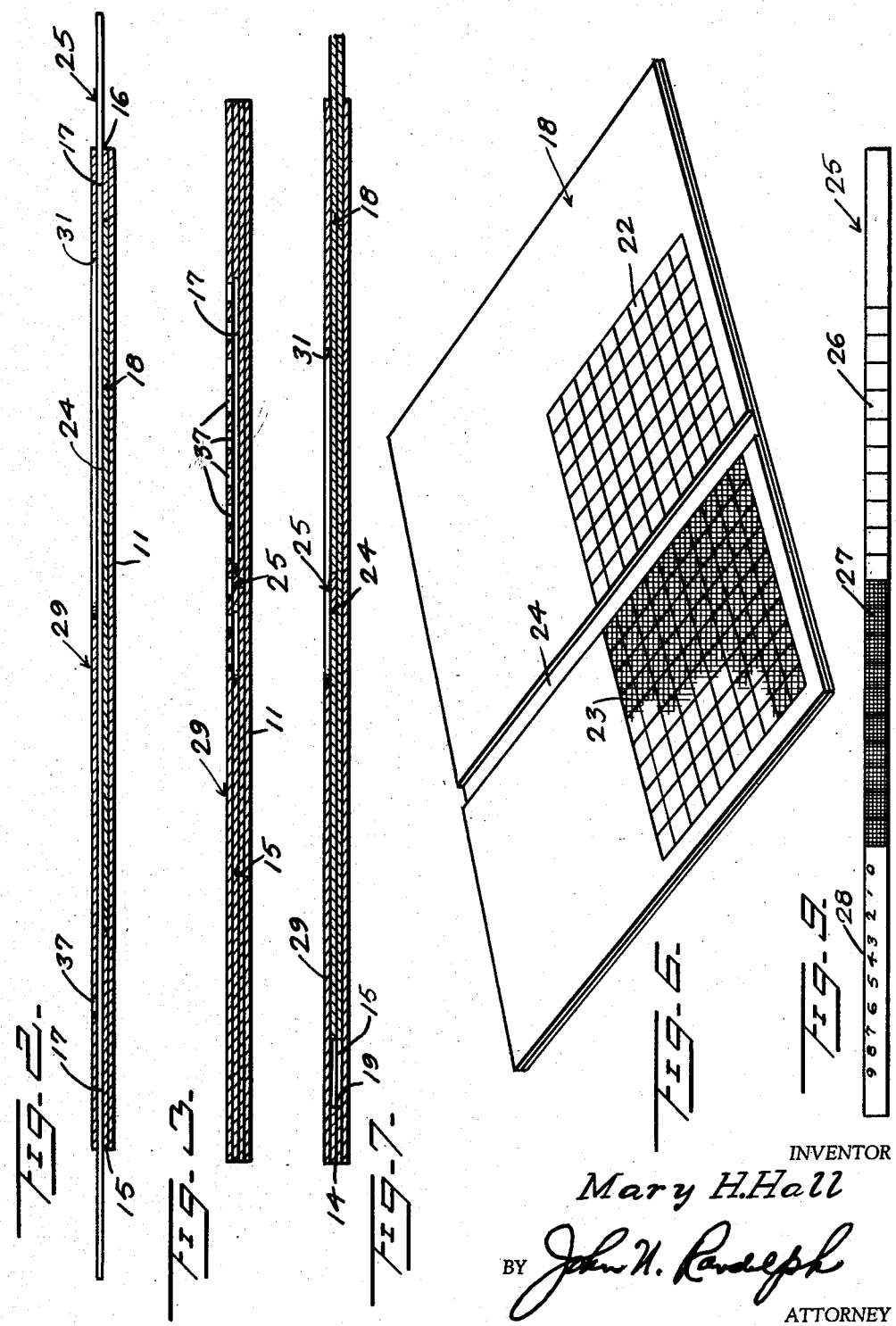

Dec. 1, 1959  M. H. HALL  2,914,865
ARITHMETIC TEACHING AID TO DEMONSTRATE FRACTIONS
Filed Sept. 26, 1958  3 Sheets-Sheet 3

INVENTOR
*Mary H. Hall*
BY *John N. Randolph*
ATTORNEY

United States Patent Office 2,914,865
Patented Dec. 1, 1959

2,914,865

ARITHMETIC TEACHING AID TO DEMONSTRATE FRACTIONS

Mary H. Hall, Charleston, W. Va.

Application September 26, 1958, Serial No. 763,601

6 Claims. (Cl. 35—75)

This invention relates to a visual or graphic aid for use in teaching arithmetic and more particularly for showing the relationship graphically between the three forms of fractions, i.e., percent, decimal fractions and common fractions.

More particularly, it is an aim of the present invention to provide a device which can be readily set manually for showing a common fraction, a decimal fraction or percent and when thus set will automatically be positioned to visually disclose the equivalent of the other two forms of fractions to thus provide a graphic representation of the equivalent values in the several forms.

A further object of the invention is to provide an apparatus which is especially advantageous in the teaching of fractions, since it affords a pupil or pupils kinaesthetic and pictorial contact with fractional parts in addition to the mere abstract theory of fractions.

Various other objects and advantages of the invention will hereinafter become more fully apparent from the following description of the drawings, illustrating a presently preferred embodiment thereof, and wherein:

Figure 1 is a top plan view of the fully assembled device;

Figure 2 is a transverse or horizontal sectional view thereof, on an enlarged scale, taken substantially along a plane as indicated by the line 2—2 of Figure 1;

Figure 3 is an enlarged longitudinal or vertical sectional view taken substantially along a plane as indicated by the line 3—3 of Figure 1;

Figure 6 is a perspective view, on a reduced scale relative to Figure 1, of one part of the apparatus;

Figure 7 is an enlarged longitudinal vertical sectional view, taken substantially along a plane as indicated by the line 7—7 of Figure 1;

Figure 8 is an enlarged fragmentary vertical sectional view, taken substantially along a plane as indicated by the line 8—8 of Figure 1, and Figure 9 is a plan view of one element of the apparatus.

Figure 4:
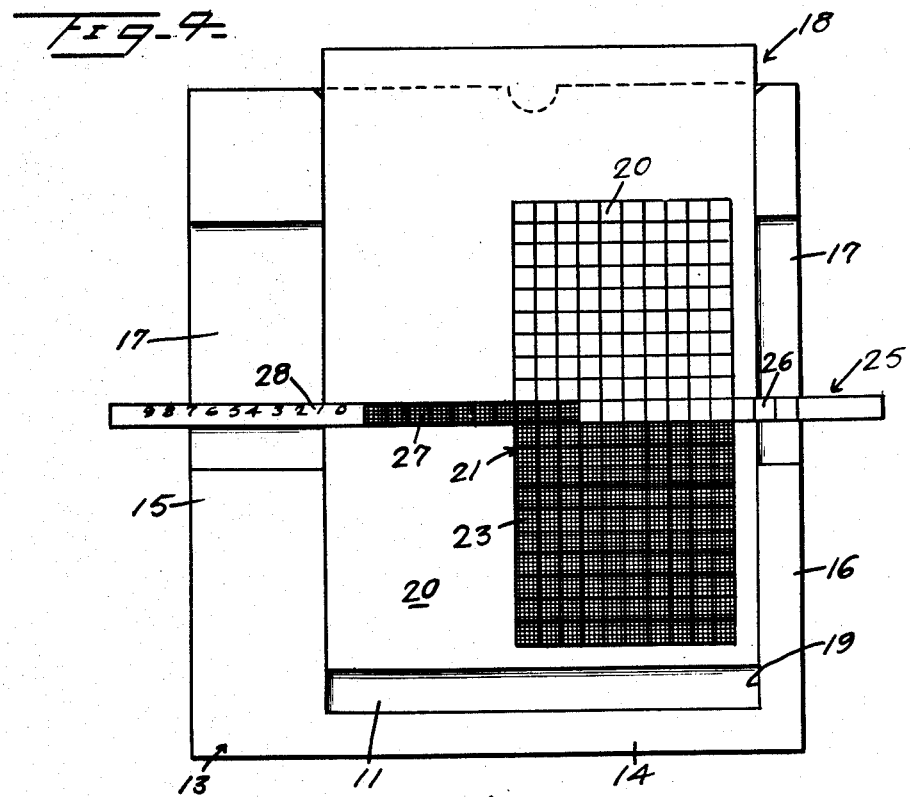
Figure 4 is a plan view, on a reduced scale, showing the apparatus with the front plate removed.
Figure 5:
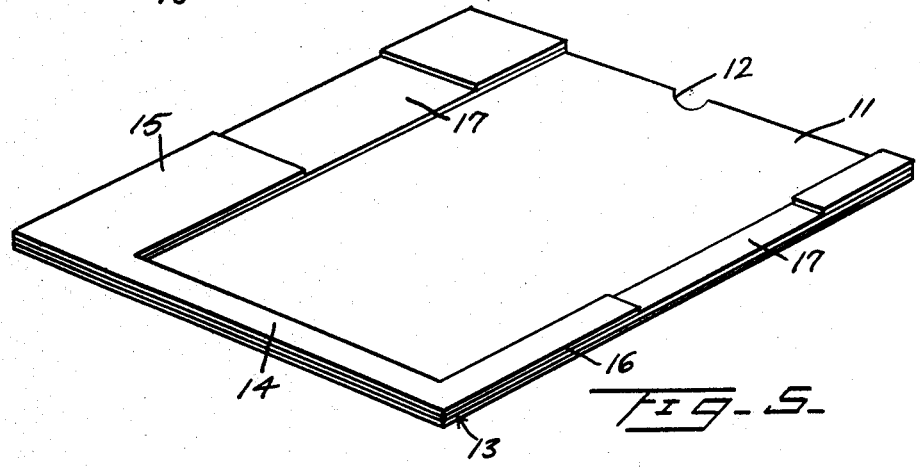
Figure 5 is a perspective view, on a reduced scale, looking toward the front of a part of the apparatus and with certain of the parts as shown in Figure 4 removed.

Referring more specifically to the drawings, the arithmetic teaching aid in its entirety, and as shown in Figure 1, is designated generally 10 and includes a rectangular back plate 11 which is solid except for a semicircular notch 12 in the upper end or top thereof. A two-ply frame, designated generally 13, is disposed on and secured to the inner or front side of the back plate 11 and includes an end portion 14 extending across the lower end or bottom of the back plate 11 and side portions 15 and 16 extending from the bottom to the top of the plate 11 and disposed along the side edges thereof. The side portion 15 is of a width substantially greater than the width of the side portion 16, as clearly illustrated in Figures 4 and 5. The upper plies of the two frame sides 15 and 16 are partially cut away to provide grooves or recesses 17 which are disposed in transverse alignment to one another and which are spaced from the upper and lower ends of said sides.

A slide, designated generally 18, of two-ply thickness is sized to fit relatively snug but slidably in a recess 19, formed by the frame 13, the thickness of the two plies of said slide 18 corresponding to the thickness of the two plies of the frame 13.

The front face 20, formed by the upper ply of the slide 18, contains a graph 21 which is ten squares in width and which includes nine horizontal rows of white squares 22 and ten horizontal rows of black squares 23. The black squares 23 are disposed below the white squares 22 and are separated therefrom by a groove 24 extending from side to side of the slide 18, as seen in Figure 6, and which is of a width corresponding to a width of one of the horizontal rows of squares. The groove 24 is formed by cutting out a portion of the upper ply of the slide 18.

The teaching apparatus 10 also includes an elongated strip 25 of a width to fit slidably in the groove 24 and of a thickness no greater than the thickness of the upper ply of the vertical slide 18 and preferably slightly less than the thickness of the upper ply of the frame 13. The upper side or face of the strip 25 contains a row of ten white squares 26 and a row of ten black squares 27, which are disposed immediately to the left of the white squares 26. The squares 26 and 27 are spaced from the ends of the strip 25. The left-hand end portion of the upper side of the strip 25 has a row of numerals 28 from "0" to "9" reading from right to left, as best illustrated in Figure 9, wherein the numerals are spaced apart a distance corresponding to the size of the individual squares. The strip or bar 25 forms a horizontal slide and is of a length greater than the width of the back plate 11 or frame 13, and portions of said horizontal slide extend across and fit slidably in the grooves 17.

The teaching device 10 also includes a front plate 29 of the same size as the rear plate 11 and which is disposed over the frame 13. The plies of the frame 13 are secured to one another and to the back plate 11 and front plate 29, in any suitable manner, and the plies of the vertical slide 18 are likewise secured together in any conventional manner. The upper end or top of the front plate 29 is provided with a notch 30, corresponding to and disposed in alignment with the notch 12, as best seen in Figure 8. The front plate 29, near the right-hand side thereof, and nearer the upper than the lower end thereof, is provided with a square opening or window 31 through which ten horizontal and vertical rows of the squares 22 and 23 can be simultaneously exposed. The plate 29, along each side of the opening or window 31, is provided with graduations 32 that are spaced apart a distance to align with the lines forming the borders of the squares. The graduations 32, disposed below the window 31, form parts of a percentage scale and are designated from left to right from "1%" to "9%," and which scale is designated generally 33. The graduations 32, along the left-hand border of the window 31, form a part of a decimal fractions scale in tenths, designated generally 34, and are numbered consecutively from bottom to top ".10" to ".90." The scale 34 also includes the indicia "00," in line with the bottom edge of the opening 31, and the indicia "1.00" in line with the top edge of the opening 31. The graduations 32 along the right-hand side of the window 31 are designated from bottom to top by the legends "10%" to "90%" in tens to constitute the percent scale 35, which also includes the legend "100%," disposed in line with the upper edge of the window 31. The graduations 32 along the upper edge of the window 31 form a part of a decimal fraction scale in hundredths, designated generally 36, and which graduations bear the legends ".01" to ".09," reading from left to right.

The front plate 29 has a vertical row of openings 37 disposed adjacent its left-hand edge, and which openings are spaced from one another. The number "100" appears beneath and to left of each opening 37, and each of the openings 37, except the bottommost opening, contains a numeral to the left thereof above the associated number "100." Said numerals read consecutively from "1" to "10" from bottom to top and combine with the numbers "100" and the openings 37 to form a common fraction scale 38.

To use the apparatus 10, the graphic scale, normally viewed through the window 31, is cleared by moving the vertical slide 18 downward and pulling the horizontal slide 25 to the left until only the white squares 22 and 26 are visible through the window 31.

To make a percentage setting on the apparatus 10 from the aforementioned, initial position of the parts, the vertical slide 18 is moved upward until the top edge of the black squares 23 is disposed in alignment with the graduation 32 of the scale 35, reading the desired tens of percent. For example, if it is desired to set a reading of "23%," the upper row or border of the black squares 23 is disposed in alignment with the graduation of the scale 35 containing the legend "20%." The horizontal slide 25 is then moved from left to right until the right-hand end of the black squares 27 is disposed in alignment with the graduation 32 of the scale 33 bearing the legend "3%." The apparatus 10 is then set to a reading of "23%." Also, by reading the decimal fraction scale 34, which is in tenths, with the decimal fraction scale 36 which is in one hundredths, provides a reading of ".23," and which is the equivalent decimal fraction value of "23%." Also, in checking the common fraction scale 38 it will be noted that the numeral "3" of the scale 28 of the horizontal slide 25 is visible through the opening 37 to the left of which is disposed the numeral "2," which numerals when read together in conjunction with the number "100" disposed immediately therebeneath, gives the corresponding or equivalent reading in common fractions.

In a like manner, a setting in decimal fractions may be made with the apparatus 10, starting from the aforedescribed initial position, by moving the vertical slide 18 upward until the top border of the black squares 23 aligns with the desired tenths on the decimal fraction scale 34. The horizontal slide 25 is then moved from left to right until the line constituting the right-hand end of the row of black squares 27 is directly beneath the desired hundredth graduation of the scale 36. After making such a setting, percentage or common fraction may be easily read, as previously described, and which constitutes the equivalent of the decimal fraction.

To make a setting in common fractions of 23/100, for example, on the apparatus 10, from the initial position as previously described, the vertical slide 18 is moved upwardly until the "0" of the scale 28 is exposed through the opening 37 disposed beside the numeral "2." The horizontal slide 25 is then moved from left to right until the numeral "3" of the scale 28 is exposed through said opening 37. The equivalent of the common fraction as read on the scale 38 can be read in percentages by utilizing the scales 35 and 33 and in decimal fractions by utilizing the scales 34 and 36.

It will be understood that the thumb and index finger can be inserted through the notches 30 and 12, respectively, for drawing the vertical slide 18 upwardly from the initial position of the apparatus 10, wherein said vertical slide is fully seated in the pocket 19.

The parts forming the apparatus 10 may be formed of various sheet- or plate-like materials such as cardboard, wood, metal or plastic. The size of the apparatus may be varied substantially from a small size for desk use to a large size for use in instructing a class.

Various modifications and changes are contemplated and may be resorted to, without departing from the function or scope of the invention as hereinafter defined by the appended claims.

I claim as my invention:

1. An arithmetic teaching aid comprising a front plate of elongated construction provided with a substantially square opening, a vertical slide having a front face provided with a graph including nine vertical rows and ten horizontal rows of white squares and ten horizontal and ten vertical rows of black squares, disposed beneath the while squares, means slidably supporting said vertical slide behind said front plate for sliding movement longitudinally thereof, said vertical slide being provided on its front side with a transverse groove extending from side to side thereof and disposed between said black and while squares, a horizontal slide mounted for sliding movement in said groove transversely of said front plate and vertical slide, said horizontal slide having a longitudinal row of ten white squares, a longitudinal row of ten black squares disposed to the left of said white squares, and a numeral scale disposed to the left of said black squares and composed of the numerals "0" to "9" arranged consecutively from left to right and in spaced apart relation to one another, said front plate having related decimal fraction scales along two sides of said opening thereof and related percent scales along the two remaining sides thereof, whereby equivalents in percentages and decimal fractions may be read by adjustment of the vertical slide and horizontal slide for exposing different arrangements of black and while squares through said opening, and said front plate having longitudinally spaced openings and associated legends combining with the numeral scale of said horizontal slide to form a common fraction scale related to and providing a reading in common fractions equivalent to the reading in decimal fractions or percentages as disclosed on said graph.

2. An arithmetic teaching aid as in claim 1, said means for slidably mounting said vertical slide behind the front plate including a back plate and a spacing frame, said spacing frame being interposed between and connected to portions of the front plate and back plate and combining therewith to form a pocket for slidably receiving the vertical slide and recesses in which portions of said horizontal slide are disposed for movement longitudinally and transversely of the front plate.

3. An arithmetic teaching aid as in claim 2, said front and rear plates having recesses exposing a portion of the vertical slide for manual engagement and movement thereof longitudinally of the front plate, and said horizontal slide having end portions protruding outwardly beyond side edges of the front and rear plates and adapted to be manually engaged for moving said horizontal slide longitudinally thereof and relative to the vertical slide.

4. An arithmetic teaching aid comprising a front plate having an upper end and a lower end, a vertical slide, means slidably mounting said vertical slide behind said front plate for sliding movement longitudinally of the front plate, said vertical slide having a front face provided with a graph including ten horizontal and nine vertical rows of white squares and ten vertical and ten horizontal rows of black squares disposed below the white squares, said front plate having a square opening through which ten vertical and ten horizontal rows of the graph are exposed, said front face having a groove extending across the vertical slide between the black and white squares of the graph, an elongated horizontal slide disposed in said groove for sliding movement therein crosswise of the front plate and vertical slide, said horizontal slide having a front face provided with a longitudinal row of ten white squares and a longitudinal row of ten black squares disposed in end-to-end relation to one another, said slides being adjustable relative to the front plate for positioning different numbers of the white and black squares thereof in exposed positions in the front plate opening, and said front plate having arithmetical scales in the outer side thereof and extending along the sides of said opening for use with said graph for visually indicating arithmetical equivalents.

5. An arithmetic teaching device as in claim 4, said horizontal slide having another portion provided with a numbers scale, and said front plate having a series of spaced openings and related indicia combining with said numbers scale for visually disclosing another arithmetical equivalent.

6. An arithmetic teaching aid comprising an elongated front plate having an upper end and a lower end, said front plate being provided wtih openings and related indicia on the front side thereof and adjacent said openings, a vertical slide, means slidably mounting said vertical slide behind the front plate for movement longitudinally thereof, a horizontal slide reciprocably supported by said vertical slide for movement relative to the vertical slide in directions crosswise thereof and for movement in unison with the vertical slide longitudinally of the front plate, and said slides having indicia including distinctively colored graphs and numerals arranged to be selectively exposed through openings of the front plate and cooperating with the indicia of the front plate for graphically illustrating arithmetical equivalents.

References Cited in the file of this patent

UNITED STATES PATENTS

| | | |
|---|---|---|
| 565,797 | Roller | Aug. 11, 1896 |
| 2,188,723 | Posey | Jan. 30, 1940 |
| 2,656,618 | Pescatori | Oct. 27, 1953 |
| 2,770,900 | Smith | Nov. 20, 1956 |